United States Patent [19]

Idstein

[11] Patent Number: 4,637,580
[45] Date of Patent: Jan. 20, 1987

[54] FOOD STORAGE DEVICE

[76] Inventor: Paul H. Idstein, 506 Stuart, Grayslake, Ill. 60030

[21] Appl. No.: 783,455

[22] Filed: Oct. 3, 1985

[51] Int. Cl.$^4$ .............................................. A47F 5/08
[52] U.S. Cl. ...................................... 248/95; 248/360; 248/312; 248/316.5; 248/220.2
[58] Field of Search .................... 248/95, 360, 359 R, 248/359 F, 309.1, 314, 312, 316.5, 316.8, 220.2, 221.3; 211/89; 24/30.5 R, 30.5 L, 30.5 P

[56] References Cited

U.S. PATENT DOCUMENTS

| | | | |
|---|---|---|---|
| 1,282,753 | 10/1918 | Carwalho | 248/312 |
| 3,292,962 | 12/1966 | Valli | 248/316.5 X |
| 3,365,068 | 1/1968 | Crosby | 248/312 X |
| 3,387,810 | 6/1968 | Sakier | 248/312 X |

FOREIGN PATENT DOCUMENTS

| | | | |
|---|---|---|---|
| 786760 | 9/1935 | France | 211/89 |
| 1477738 | 3/1967 | France | 24/30.5 R |

Primary Examiner—Ramon S. Britts
Assistant Examiner—Karen J. Chotkowski
Attorney, Agent, or Firm—Robert M. Carwell

[57] ABSTRACT

In combination, a closing assembly means for resealably closing and sealing the neck of a food bag and a storage rack means for supporting the closing assembly. A plurality of disk-shaped members each receiving in a cavity centrally therethrough the neck of a food bag or like container. Each disk member includes a closing member pivoting from the disk member at one end whereby an intermediate portion of the closing member moves across the cavity into a ring-shaped portion thereof internal of the disk member. In operation, when the food bag neck extends through the cavity and the closing member is pivotally moved within the ring-shaped portion of the cavity, the neck is forced into the cavity and retained therein in a press-fit. The storage rack means includes a plurality of semi-circular rack apertures having diameters slightly smaller than that of the disk-shaped members. Upon application of the closing assembly means, the disk member is inserted into the rack aperture and retainedly and releasedly held thereby also in a press-fit, whereby the food bags are supported by the rack which is disposed at a preselected desired location.

5 Claims, 2 Drawing Figures

FOOD STORAGE DEVICE

FIELD OF THE INVENTION

This invention relates to the storage of foodstuffs and, more particularly, relates to apparatus for resealing and storing food containers of the bag variety or the like.

BACKGROUND OF THE INVENTION

Mechanisms have long been available for resealing foodstuff containers of the bag variety ranging from the familiar rubber band to far more elaborate devices. With respect to such apparatus, it is conventional to seek to provide a means for circumscribing the neck of the bag and thereafter providing for a radially inward force to be exerted thereupon so as to close off the neck of the bag to promote sealing of the contents of the bag from the ambient and thus to promote freshness of the foodstuffs contained therein.

With respect to such closure members, in an effort to get an airtight seal, oftentimes extremely cumbersome mechanisms have been devised. For example, in the patent to Wightman, U.S. Pat. No. 588,848, a rather elaborate racheting circular device is provided for cinching up about the bag neck and includes an equally cumbersome spring-load release mechanism. In like manner, U.S. Pat. No. 637,068 to Bang provides for a circular closure member and a thread screw for tightening about the bag neck, again suffering from the drawback of its complexity, moving parts, and the like. Yet another example of this sealing approach about bag necks may be seen in U.S. Pat. No. 663,540 to Hansen wherein again a circular member is provided for circumscribing the bag neck whereupon radially inward force is applied to close off the neck. The foregoing approaches, in addition to their complexity, suffer from a more serious drawback that frequently the ambient air is not entirely cut off from the interstices of the bag, thereby adversely affecting the subsequent freshness of the foodstuffs contained therein. Even with respect to alternate attempts to provide sealing force, such as the clothespin type clamp depicted in U.S. Pat. No. 4,394,791 to Groth, these approaches suffer from drawbacks such as requiring the entire width of the sealing surface of the bag to be sealed which is approximately the diameter of the aperture of the neck of the bag.

Additionally, in the prior art, numerous means have been provided for supporting foodstuff bags for containers. An example of this may be seen in U.S. Pat. No. 4,291,810 to Rubenstein, which provides for a vertically aligned plurality of clip-like members for supporting a plurality of food bags in vertical alignment. However, no provision is made for resealing the bags. Moreover, even if the clips disclosed in food bag storage racks such as those depicted in the aforementioned patent to Rubenstein resealed the bags being supported thereby, once the thus-supported bags were removed from the support rack this resealing effect would be lost.

Accordingly, it was highly desirable to provide apparatus for resealing a food bag about its neck in a more improved fashion whereby it was more reliably and completely sealed from ambient air. Moreover, it was highly desirable to provide for such apparatus which could easily and with a very simple and inexpensive construction provide for repeated rapid resealing of such containers. Still further, it was desirable to provide for such a resealing apparatus wherein the device effecting the sealing could be employed to effect a supporting storage of one or more such foodstuff containers from a desired preselected location as, for example, from a storage rack mounted on a kitchen wall or the like. Still further, it was highly desirable to provide for such a sealing mechanism which could readily and easily be released and attached alternately to the storage rack whereby the container was sealed regardless of whether the food container was being disposed from the storage rack or at another location.

SUMMARY OF THE INVENTION

In combination, a closing assembly means for resealably closing and sealing the neck of a food bag and a storage rack means for supporting the closing assembly. In a preferred embodiment, a plurality of disk-shaped members are provided each adapted to receive in a cavity extending centrally therethrough the neck of a food bag or like container such as those used for storing potato chips, bread, or the like. Each disk member includes an elongate closing member pivoting from the disk member at one end thereof so as to move an intermediate portion of the closing member across the cavity and into a ring-shaped portion of the cavity which is internal of the disk member. In operation, when the neck portion of the food bag extends through the cavity and the closing member is pivotally moved as described so as to be disposed within the ringshaped portion of the cavity, a portion of the food bag neck is forced into the ring-shaped cavity and retained therein in a press-fit with the intermediate portion of the closing member. The storage rack means includes a plurality of semi-circular rack apertures having diameters slightly smaller than that of the disk-shaped members. Upon sealingly closing the food bag neck by the closing assembly means as aforementioned, the disk member is inserted into the rack aperture and retainedly and releasedly held thereby also in a press-fit, whereby the food bags are thereby supported by the storage rack means which is disposed at a preselected desired location such as a kitchen wall or the like.

It is a feature of the present invention to provide for substantially air-tight sealing and resealing, as desired, about the neck of a foodstuff bag and, moreover, to provide for such sealing ability wherein the bag, upon being resealed, may remain in such state both when the closing assembly means of the present invention is supported by the storage rack means of the present invention and, alternatively, when the bag and closing assembly means in combination are separated from the storage rack means. The portion of the cavity internal of the disk member will preferably be selected so as to have a dimension functionally related to the thickness of the intermediate portions of the closing member and the thickness of the foodstuff bag neck when folded over. Accordingly, the dimension of this cavity portion in the longitudinal direction of the disk member will preferably be preselected so as to retain the intermediate portion of the closing member with the neck portion of the container folded thereabouts on either side in a press-fit fashion so as to seal off ambient air from entering the interstices of the container.

DETAILED DESCRIPTION OF THE INVENTION

Figure 1:
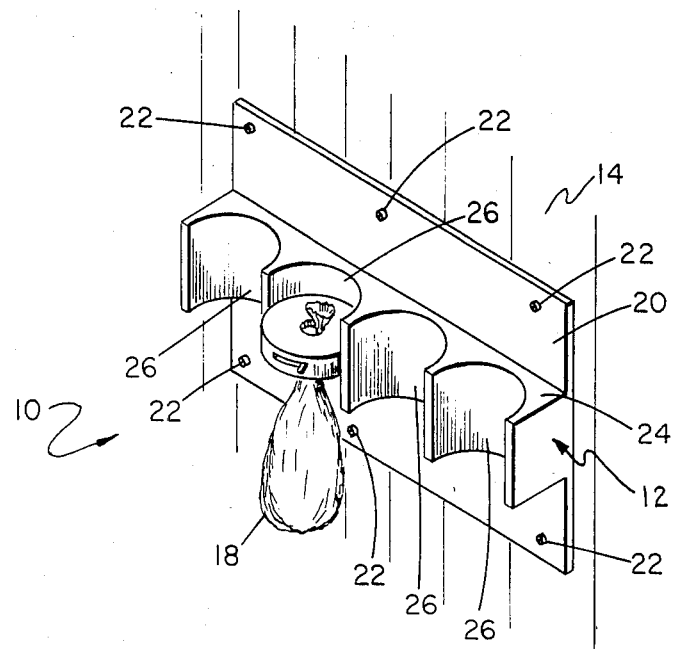
FIG. 1, is a pictorial representation of the food storage device of the present invention.

With reference to FIG. 1, there will be seen depicted therein generally a food storage device 10 of the present invention. In the preferred embodiment depicted therein, the food storage device 10 will preferably be comprised, in combination, of one or more closing assembly means 16 and a storage rack means 12 for releasably supporting one or more of these closing assembly means 16. It will be noted from FIG. 1 that the storage rack means 12 may preferably be supported from a desired preselected location 14 such as a kitchen wall or the like wherein it is desired to store containers for foodstuffs such as the food bag 18 depicted in FIG. 1. Accordingly, the storage rack means 12 may be supported from the location 14 by any convenient means such as the screw or bolt-type fasteners 22 depicted in FIG. 1.

Referring first to FIG. 1 and a description in more detail of the storage rack means 12 of the present invention, it will be noted that the storage rack means 12 is preferably comprised of a relatively flat mounting plate 20 which will be vertically positioned against the location 14. Extending horizontally outwards from an intermediate portion of the mounting plate 20, a closing assembly means holder 24 will be provided. This holder 24 will preferably take the form of a member having a plurality of semi-circularly shaped rack apertures 26 aligned in a side by side fashion each for receiving a respective one of a plurality of the closing assembly means 16. In operation, it will be appreciated that upon disposing a closing assembly means 16 about a food bag in a sealed fashion to be hereinafter described, the closing assembly means 16 may be inserted into a respective one of the rack apertures 26 wherein it will be releasably retained also in a manner to be hereinafter described. It will thus be appreciated that with the closing assembly means 16 disposed about the neck of its respective food bag 18, the food bag 18 will thence be resealed regardless of whether the closing assembly means 16 is disposed in combination with the storage rack means 12 as shown in FIG. 1 or whether, in the alternative, the food bag 18 is disposed at another location in combination with the closing assembly means 16. Thus, at all times, whether the food bag 18 is being vertically disposed from the food storage device 10 or not, it is in a resealed state. However, it will be further appreciated that as desired one or more of the thus resealed food bags 18 may conveniently be pendantly supported from the storage rack means in a side-by-side fashion.

Figure 2:
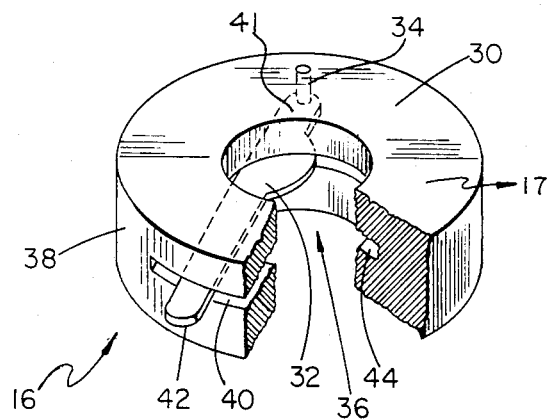
FIG. 2 is a pictorial illustration, partly in section, a closing assembly means portion of the food storage device illustrated in FIG. 1.

Referring now to FIG. 2, there will be seen depicted therein a representative closing assembly means 16 as contemplated by the present invention. This closing assembly means 16 will preferably take the form of a disk-shaped member 17, an elongate closing lever means 32, and a pin means 34 interconnected at a first end 41 of the lever means 32 to the disk member 17 whereby the lever means 32 may be pivotally rotated about the pin means 34 and the first end 41. The disk member 17 will preferably be defined by a pair of ring-shaped parallel disk surfaces 30 and an outer cylindrically-shaped sidewall 38.

Further reference to FIG. 2 will indicate that the disk member 17 further defines a cavity 36 having a cylindrically-shaped portion thereof with a longitudinal axis in coaxial alignment with a central longitudinal axis of the disk member 17. Disposed between the disk surfaces 30 and extending from the cylindrically-shaped portion of the cavity 36 radially outwards through the sidewall 38 is a slot portion of the cavity 36. Additionally, internal of the disk member 17, a ring-shaped cavity portion 44 is further provided. The radially outwardmost or second end 42 of the closing lever means 32 preferably extends radially outwards of the sidewall 38, and a portion of the lever means 32 extends through the slot portion 40. Due to the aforementioned pivoting action about the pin means 34, by rotating the second end 42 of the lever means 32 to the right, as depicted in FIG. 2, e.g., in a counterclockwise direction, portion of the lever means 32 intermediate of the first and second ends 41 and 42 of the lever means 32 will move through the cylindrically-shaped aperture portion of the cavity 36 and in a direction generally transverse to the longitudinal central axis of the disk member 17. Moreover, upon sufficient such movement of the second end 42 of the lever means 32, this intermediate portion of the lever means will further be introduced into the portion 44 of the cavity 36.

The resealing operation of the closing assembly means 16 may thus now be appreciated in more detail. In order to reseal a food bag 18 about the neck thereof, the second end 42 of the lever means 32 is first positioned generally to the left as depicted in FIG. 2 so as to establish at least a portion of the aforementioned cylindrical aperture extending through the disk member 17. The neck of the food bag 18 is thence introduced into and through the cylindrical portion of the cavity 36 of the closing assembly means 16 until a portion thereof extends past the upper disk surface 30 of the disk member 17, as shown in FIG. 1. Thereafter, the second end 42 is rotated in the hereinbefore described counterclockwise direction. Upon so doing, it will be apparent that the intermediate portion of the lever means 32 will begin to force a portion of the neck of the food bag 18 into the portion 44 of the cavity 36 as the intermediate portion of the lever means 32 itself is thus being introduced into this cavity portion 44. The closing assembly means 16 as viewed in cross-section thus will reveal that internally of the cavity portio 44 of the cavity 36, there will be found a U-shaped portion of the neck of the food bag 18 with the intermediate portion of the lever means 32 disposed internally of this U-shaped portion of the neck in a press-fit fashion.

It is a feature of the present invention to preselect the thickness of the lever means 32, and the height of the cavity portion 44 in functional relation to the expected thickness of the portion of the neck of the food bag 18 when in the U-shaped configuration in functional relation so as to establish a press-fit whereby the U-shaped portion, and the intermediate portion of the lever means 32 will be retainedly held within the cavity portion 44 in a press-fit fashion, with the folding of the neck of the food bag 18 in the U-shaped configuration establishing the airtight seal as desired. In this manner, the food bag 18 with the closing assembly means 16 disposed thereabout may be moved to any desired location with the bag 18 always thus remaining in a sealed condition.

When it is desired to reopen the food bag 18, the hereinabove noted procedure is reversed. The second end 42 of the lever means 32 is moved from the second position just described back to its initial first position in a clockwise direction, whereupon the intermediate portion of the lever means 32 is removed from the cavity portion 44 of the cavity 36. The closing assembly means 16 is thereby released from the food bag 18, whereupon the neck thereof may be extracted through the cylindrically-shaped aperture in the disk member 17.

It is contemplated by the present invention to provide for storage and support of the food bag 18 when in the thus-described sealed condition as depicted in FIG. 1. Accordingly, in a preferred embodiment, it will be appreciated that the sidewall 38 of the disk member 17 will define a diameter extending generally transverse to the longitudinal central axis of the disk member 17. In like manner, each of the semi-circular rack apertures 26 will also define a diameter. It will accordingly be preferred to preselect the aforementioned diameter of the disk member 17 to be slightly larger than that of the rack apertures 26. In this manner, when the disk members 17 are disposed within corresponding rack apertures 26 in mating engagement therewith, such engagement will be in a press-fit whereby the closing assembly means 16 in combination with the food bag 18 may be releasably attached to the closing assembly holder 24 as desired.

Although a preferred embodiment of the present invention has been herewith depicted and described with reference to FIGS. 1 and 2, it will be readily apparent that the invention admits of numerous variations without departing from the spirit and scope thereof. For example, although for ease of manufacture and the like, it is generally desirable to fashion the storage rack means 12 and the closing assembly means 16 of a plastic composition, any suitable material well known in the art may be substituted therefor. Also, in the embodiment described herein a disk-shape has been provided for the member 17 and a matingly-shaped aperture 26. However, as desired, the member 17 and aperture 26 may be of some other geometrical configuration as desired, such as ellipsoid or the like. The disk member 17 may preferably be in the donut shape depicted, a portion of which has been cut away in section for clarity. However, it is not essential that the disk member 17 be in a completely toroidal shape and thus the portion thereof omitted in FIG. 2 for purposes of illustration only may in fact be omitted in an alternate embodiment in order to more readily facilitate insertion of the neck of the food bag 18 into the cavity 36.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

What is claimed is:

1. Apparatus for resealing a foodstuff container of the bag variety about its neck and releasably supporting said container from a preselected location, comprising:
    a closing assembly means for releasably resealing said container about said neck including:
        a cavity internal of said assembly means for receiving a portion of said neck;
        closing means pivotable about a first end for forcing a portion of said neck into a portion of said cavity whereby said neck portion and said closing means are retainedly and releasably held within said portion of said cavity in a press-fit;
    a storage rack means for releasably supporting said closing assembly means; wherein
    said first end of said closing means is internal to said closing assembly means;
    said cavity is formed about a central longitudinal axis;
    said closing means includes a second end extending radially outwards of said axis;
    said closing assembly means further includes
        pin means for interconnecting said closing means in said pivotable relation about said first end; and
    said closing means further includes a second end pivotable about said first end whereby said closing means moves in a plane intersected by said axis when moving between a first and second position;
    when said closing means moves between said first and second positions a portion of said closing means moves in a cross-sectional area defined by a plane intersected by said axis and intersecting said cavity;
    said storage rack means defines a rack aperture for slidably and releasably receiving and retaining a portion of said closing assembly means;
    said closing assembly means further defines a slot in communication with said cavity; and
    a portion of said closing means extends through said slot and radially outwards thereof whereby a portion of said closing means moves along said slot when said closing means is moved between said first and second positions.

2. The apparatus of claim 1, wherein said closing assembly means defines a pair of toroidal-shaped parallel disk surfaces and a cylindrical sidewall interconnecting the circumference of said disk surfaces.

3. The apparatus of claim 2, wherein said slot is disposed intermediate said disk surfaces.

4. The apparatus of claim 3, wherein
    said sidewall defines a first diameter;
    said storage rack means defines at least one semi-circular rack aperture having a second diameter; and
    said second diameter is smaller than said first diameter in an amount sufficient to cause said closing assembly means to be retainedly and releasably held by said storage rack means when disposed within said rack aperture in a press-fit engagement.

5. The apparatus of claim 4, wherein said at least one rack aperture comprises:
    a plurality of rack apertures aligned along an axis perpendicular to said longitudinal axis of said closing assembly means when said closing assembly means is disposed in said press-fit engagement with said storage rack means.

* * * * *